(12) United States Patent
Hossick-Schott et al.

(10) Patent No.: US 7,002,790 B2
(45) Date of Patent: Feb. 21, 2006

(54) CAPACITOR IN AN IMPLANTABLE MEDICAL DEVICE

(75) Inventors: Joachim Hossick-Schott, Minneapolis, MN (US); John D. Norton, New Brighton, MN (US); Craig L. Schmidt, Eagan, MN (US)

(73) Assignee: Medtronic, Inc., Minneapolis, MN (US)

( * ) Notice: Subject to any disclaimer, the term of this patent is extended or adjusted under 35 U.S.C. 154(b) by 576 days.

(21) Appl. No.: 10/260,682

(22) Filed: Sep. 30, 2002

(65) Prior Publication Data

US 2004/0064155 A1    Apr. 1, 2004

(51) Int. Cl.
*H01G 9/04*    (2006.01)

(52) U.S. Cl. .................. 361/516; 361/504; 361/525; 361/532; 29/25.03; 607/5; 607/36

(58) Field of Classification Search ........ 361/504–505, 361/516–519, 532, 525; 607/5, 7, 36–38; 29/25.03
See application file for complete search history.

(56) References Cited

U.S. PATENT DOCUMENTS

| | | | |
|---|---|---|---|
| 4,523,255 A | 6/1985 | Rogers | 361/433 |
| 4,780,797 A | 10/1988 | Libby | 361/433 |
| 4,942,500 A | 7/1990 | Libby et al. | 361/516 |
| 5,043,849 A | 8/1991 | Libby | 361/516 |
| 5,098,485 A | 3/1992 | Evans | 148/272 |
| 5,312,439 A | 5/1994 | Loeb | 607/2 |
| 5,369,547 A | 11/1994 | Evans | 361/516 |
| 5,469,325 A | 11/1995 | Evans | 361/526 |
| 5,559,667 A | 9/1996 | Evans | 361/526 |
| 5,737,181 A | 4/1998 | Evans | 361/504 |
| 5,754,394 A | 5/1998 | Evans et al. | 361/516 |
| 5,851,506 A | 12/1998 | Zheng et al. | 423/592 |
| 5,853,888 A * | 12/1998 | Dutta et al. | 428/408 |
| 5,894,403 A | 4/1999 | Shah et al. | 361/528 |
| 5,982,609 A | 11/1999 | Evans | 361/516 |
| 6,208,502 B1 | 3/2001 | Hudis et al. | 361/503 |
| 6,818,517 B1 * | 11/2004 | Maes | 438/287 |
| 6,855,594 B1 * | 2/2005 | Bhat et al. | 438/240 |

FOREIGN PATENT DOCUMENTS

| | | |
|---|---|---|
| DE | 198 36 651 A1 | 2/2000 |
| EP | 1 207 567 A2 | 5/2002 |
| JP | 63314766 | 0/1988 |
| WO | WO 00/02213 | 1/2000 |

OTHER PUBLICATIONS

Trasatti, "Ruthenium Dioxide: A New and Interesting Electrode Material. Solid State Structure and Electrochemical Behavior", Journal of Electroanalytical Chemistry and Interfacial Electrochemistry, vol. 29, App. 1 - 5, 1971.

(Continued)

*Primary Examiner*—Anthony Dinkins
(74) *Attorney, Agent, or Firm*—Paul H. McDowall; Carol F. Barry; Girma Wolde-Michael

(57) ABSTRACT

A capacitor in an implantable medical device is provided. The capacitor having an anode, a cathode including a conductive coating, and an electrolyte disposed and in contact between the anode and the cathode. The conductive coating is composed of a chemisorbed conductive layer that is interposed between a metal substrate and a layer including a mix of activated carbon with a metal-oxide and electrolyte disposed and in contact between the anode and the cathode.

27 Claims, 4 Drawing Sheets

OTHER PUBLICATIONS

Raistrick, "Electrochemical Capacitors", in "Electrochemistry of Semiconductors and Electronics—Processes and Devices", editors: John McHardy and Frank Ludwig, Noyes Publications, 1992.

Loeb et al., "Injectable Microstimulator for Functional Electrical Stimulation", Med & Biol Eng & Comput, vol. 29, NS13-NS19, 1991.

* cited by examiner

CAPACITOR IN AN IMPLANTABLE MEDICAL DEVICE

BACKGROUND OF THE INVENTION

1. Field of the Invention

This invention relates generally to capacitors, and, more particularly, to cathode materials used in a capacitor of an implantable medical device.

2. Description of the Related Art

Since their earliest inception some forty years ago, there has been a significant advancement in body-implantable electronic medical devices. Today, these implantable devices include therapeutic and diagnostic devices, such as pacemakers, cardioverters, defibrillators, neural stimulators, drug administering devices, among others for alleviating the adverse effects of various health ailments. Today's implantable medical devices are also vastly more sophisticated and complex than their predecessors, and are therefore capable of performing considerably more complex tasks for reducing the effects of these health ailments.

Usually, body-implantable medical devices rely on battery power to perform their therapeutic and/or diagnostic tasks. The battery supplies power to the electrical components of the implantable medical device, and also typically provides power to a capacitor of the defibrillator device, which stores the energy supplied thereto from the battery. The capacitor typically includes an anode, a cathode, and a fluid electrolyte disposed between the anode and cathode. The various types of materials used for the anode, cathode, and electrolyte may have an impact on the capacitor's ability to store energy from the battery, and the rate at which the energy is stored prior to discharging the capacitor. Importantly, the materials may also affect the volume of the device. Smaller defibrillator devices, which in turn require smaller capacitors, will typically enhance the patient's comfort. Therefore, materials choices, which allow for designing a lower volume capacitor, are of specific interest.

Typically, in an implantable medical device, the capacitor is used to deliver therapeutic electric signals to the patient's heart in response to the device receiving abnormal feedback signals from the heart. The therapeutic electric signals delivered to the patient's heart may vary somewhat in intensity depending on the patients' physiology and the details of the implant. Typically, the electric pulse energy delivered to the heart is of the order of 30 J for a single defibrillation pulse. The energy stored in the capacitor has to be somewhat larger due to losses along the delivery path during the release of the energy.

The capacitor, therefore, plays a vital role in the implantable defibrillator device for if the energy supplied from the battery is not stored in a timely manner within the capacitor prior to its discharge or if the energy is not released in a timely manner during its discharge, the capacitor may not be able to deliver sufficient energy to the patient's heart at a critical point in time when deemed necessary by the implantable medical device. As a result, the patient's health may be adversely affected by the capacitor's inability to adequately and/or quickly store the energy supplied by the battery. Therefore, using electrical currents of the order of 10 mA, capacitor charge times are typically of the order of 10 seconds. Discharge times are typically of the order of 10 milliseconds. In summary, the capacitor bank of an implantable defibrillator will have to be able to deliver about 30 J of electrical energy in a total time window of about 10 seconds, using a charge current of the order of 10 mA. For the design engineer, a low charge and discharge time directly translates into a low internal resistance, or more generally speaking, impedance, of the capacitor bank in the defibrillator device. The impedance behavior of a capacitor is technically characterized by its' equivalent series resistance (ESR) value measured at a specified frequency. For a capacitor bank in a defibrillator device, the ESR measured at 120 Hz is typically of the order of 5 Ohms or less, in order to accomplish timely delivery of the therapeutic electrical pulse with minimal waste of energy lost in heating the device. The technical solution is generally sought in a capacitor design in which the anode of the individual capacitor within a bank is charged to positive potentials between 150 and 400 Volts, with charge storage capabilities ranging from about 200 to about 500 micro-Farad. As is well known to those skilled in the art, a high potential $V_a$ on the anode together with a fairly low capacitance $C_a$ has to be approximately balanced with a low potential $V_c$ and a high capacitance $C_c$ on the cathode side:

$$V_a C_a \approx V_c C_c$$

The potential on the cathode is limited to about 1.2 V, which is the potential at which electrolysis occurs in water based electrolytes at temperatures around room temperature. Electrolysis in turn causes gas formation and therefore should be avoided. Therefore, the cathode capacitance needs to be approximately 80 mF. Given the additional requirement of a small overall volume for the capacitor, this means that specific capacitances of the order of 20 mF/cm² or above are needed. Therefore, a cathode is desirable which has both, a high specific capacitance and, at the same time, a low ESR in the defibrillator capacitor application. The present invention is directed towards implementing new ways to produce low ESR, high capacitance cathode electrodes in an economical fashion, utilizing both, novel materials and materials already known to those skilled in the art.

Previous authors have addressed various aspects of this invention: in 1988, Libby (U.S. Pat. No. 4,780,797, later also in U.S. Pat. No. 4,942,500 and U.S. Pat. No. 5,043,849) purportedly discloses a novel capacitor concept by combining a porous Ta anode with a cathode made from an alloy of Ta and a member of the Pt metal family. With the regard to the cathode used in this capacitor, this concept was very likely based in part upon the early scientific results published by Trasatti, Trasatti et al., and also from Raistrick. These authors appear to have found that oxides from the group of metals consisting of hafnium, palladium, iridium, ruthenium, molybdenum and others exhibited a phenomenon, for which the term "pseudo-capacitance" was later coined (4). Materials exhibiting pseudo-capacitance can store amounts of electrical charge, which may exceed the value expected from pure geometrical considerations by orders of magnitude. Therefore, the authors argue that these materials are well suited as cathodes in electrochemical capacitors with liquid electrolytes. The actual capacitance achievable with the specific cathode suggested by Libby, however, appears to be comparatively low. In a defibrillator application, this would mean that an impractically large number of individual capacitors would have to be connected in series in order to achieve the goal of providing approximately 30 J to defibrillate the heart—therefore, the inventors contend that Libby's approach would likely not be suitable for this application.

A similar capacitor concept was later disclosed by Loeb in 1994 (U.S. Pat. No. 5,312,439). In this reference a porous electrode preferably constructed from Ta is suggested to be balanced with a high capacitance cathode constructed preferably from "activated" iridium. In the context of this particular reference "activated iridium," means a thin, chemisorbed layer of iridium oxide generated by heating bulk iridium metal in air using an acetylene torch. Specifically included in the cathode material list of this reference were oxides of the metals hafnium, palladium platinum and others. The inventors note that ruthenium oxide was apparently not disclosed, perhaps because Loeb suggested an in vivo application in which the electrode materials would have contact with body fluids and ruthenium oxide is generally known to be toxic. The cathode design, iridium with an iridium-oxide layer chemisorbed on the metal, seems to provide some desirable properties for the application; that is, both a high capacitance and a low ESR. However, iridium is extremely expensive. Therefore, the specific form of the iridium-oxide based cathode electrode with solid iridium metal as the substrate is generally acknowledged as not economical for a defibrillator capacitor application, where capacitances in excess of about 20 mF/cm$^2$ are needed.

Shortly after the Loeb patent issued, a number of U.S. patents issued to Evans relating to a capacitor using a high potential, low capacitance porous anode which as understood by the inventors were constructed preferably of Ta balanced with a low potential, high capacitance cathode, both in contact with a liquid electrolyte. The cathode material, chosen from a group of metal oxides including the oxides of platinum, iridium, hafnium, palladium and ruthenium—with ruthenium oxide being the preferred material—would be spray-coated onto the inside of the metallic case of the liquid electrolytic capacitor. Clearly, the suggested coating process does not allow for the formation of a chemisorbed high capacitance layer; rather, the high capacitance material is simply adsorbing on the surface of the substrate. Therefore, the resulting mechanical bond strength and the electrical conductivity between the substrate and adsorbate are lower than may be desirable in demanding applications. A study of the relevant patent literature will reveal the following patents issued to Evans: U.S. Pat. Nos. 5,369,547; 5,469,32; 5,559,667; 5,737,181; 5,737,181, 5,754,394 and 5,982,609.

A modification of the cathode construction discussed above, namely that of the capacitance per unit area or specific capacitance was suggested later in a patent by Hudis (U.S. Pat. No. 6,208,502). Hudis purportedly detailed the use of a sol-gel derived form of ruthenium oxide for a cathode application in a high voltage capacitor application. This form of ruthenium oxide appears to have a specific capacitance even higher than the previously known forms of ruthenium oxide. However, the coating method suggested by Hudis—namely screen-printing the cathode material onto a substrate metal surface—does not appear to lead to the formation of a chemisorption bond between the cathode substrate metal and the high capacitance layer. Therefore, the inventors believe that the ESR of such capacitors using this type of cathode is likely not as low as it is desirable in the defibrillator capacitor application.

All of the prior art patents referenced so far neither discuss nor claim a multi-layered structure of the low potential, high capacitance cathode surface in order to obtain a low ESR value of the capacitor. However, a related structure is discussed in the German "Patentoffenlegungsschrift DE 198 36 651 A1". This publication purportedly describes a sandwich-type structure having layers of material (e.g., metal-metal-carbide-carbon) for use in low-potential supercapacitor applications. The structure apparently may be generated by spray-painting a metal surface with graphite and heating the surface subsequently in vacuum and in air. Metal carbides do have conductivities comparable to those of metals and therefore this layered structure will result in a very economical capacitor with low ESR and moderately high specific capacitance. However, the capacitance values needed for the high voltage defibrillator application are higher than those achievable with construction discussed this particular reference.

SUMMARY OF THE INVENTION

In one aspect of the invention, a capacitor is provided. The capacitor comprises an anode, a cathode, and an electrolyte disposed and in contact between the anode and the cathode. The cathode includes a conductive coating that has a chemisorbed, electrically conductive layer interposed between a metal substrate and an outer layer including a mix of activated carbon with a metal-oxide.

In another aspect of the invention, a capacitor is provided. The capacitor comprises a container having an inner surface, an anode that is disposed within the container, a cathode including a conductive coating that is applied to the inner surface of the container, and an electrolyte disposed and in contact between the anode and the cathode. The conductive coating includes a chemisorbed, electrically conductive layer interposed between a metal substrate and a layer including a mix of activated carbon with a metal-oxide.

In another aspect of the invention, an implantable medical device is provided. The implantable medical device comprises a battery for supplying energy, and a capacitor, electrically coupled to the battery, for storing the energy supplied from the battery. The capacitor includes an electrolyte, anode, and a cathode. The cathode has a conductive coating including a chemisorbed, electrically conductive layer interposed between a metal substrate and a layer including a mix of activated carbon with a metal-oxide.

In another aspect of the invention, a method is provided. The method includes providing an anode, a cathode, and an electrolyte disposed between the anode and cathode. The cathode includes a conductive coating that includes a chemisorbed, electrically conductive layer interposed between a metal substrate and a layer including a mix of activated carbon with a metal-oxide.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
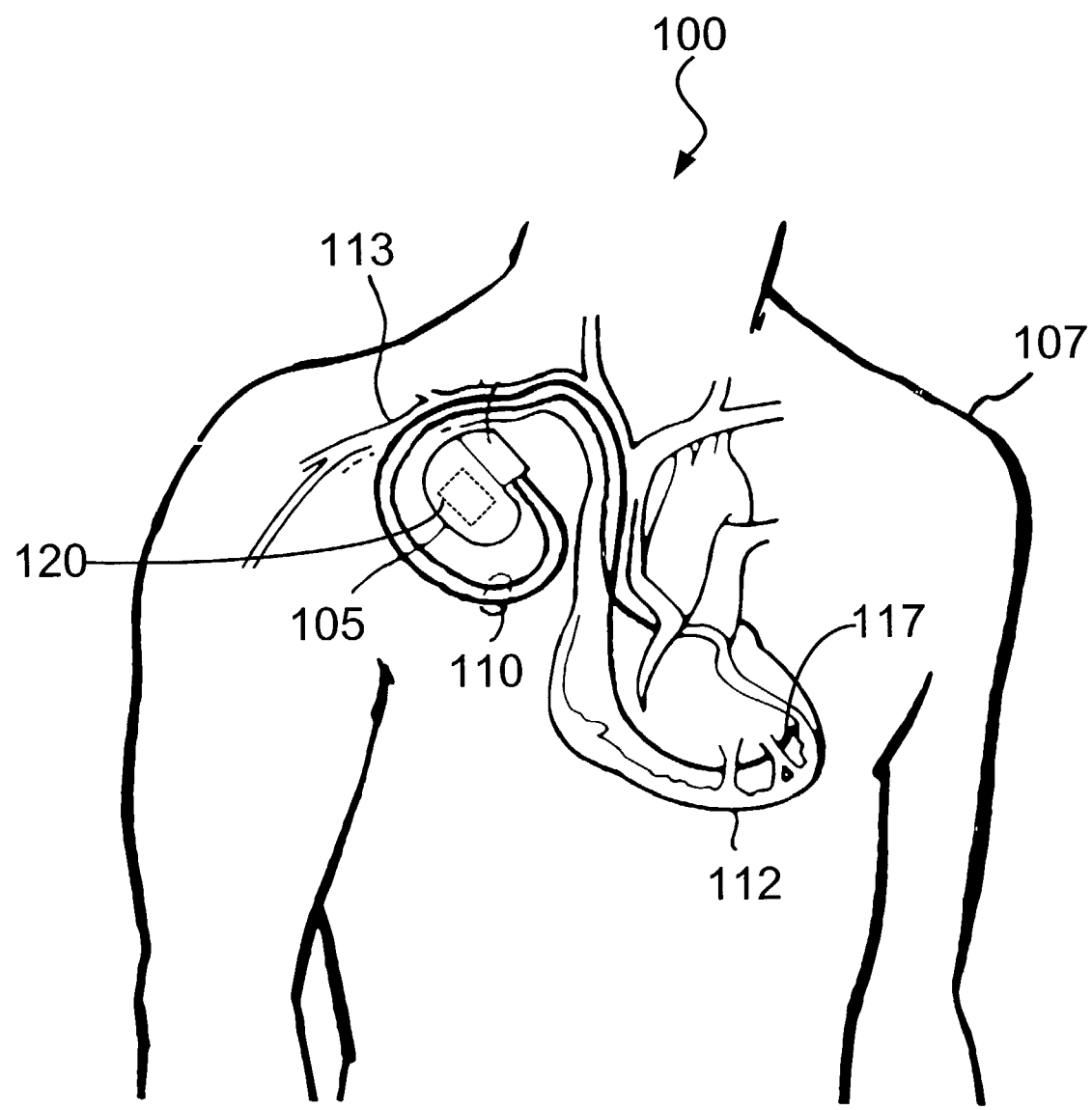
FIG. 1 schematically illustrates an implantable medical device in the form of a defibrillator and associated leads positioned to stimulate and/or sense the heart in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, an implantable medical device (IMD) system 100, which includes an implantable medical device 105, is shown in accordance with one illustrative embodiment of the present invention. According to the illustrated embodiment, the implantable medical device 105 takes the form of a defibrillator, and may be implanted within a patient 107 for providing a therapeutic electric shock to the patient's heart 112. It will be appreciated, however, that the implantable medical device 105 may alternatively take the form of various other medical devices including, but not necessarily limited to, a pacemaker, cardioverter, neural stimulator, drug administering device, etc. without departing from the spirit and scope of the present invention.

The implantable device 105 is housed within a hermetically sealed, biologically inert outer container or housing, which may itself be conductive so as to serve as an electrode in the defibrillator's sensing circuit. One or more leads, collectively identified with reference numeral 110 in FIG. 1, are electrically coupled to the implantable device 105 and extend into the patient's heart 112 via a vein 113. Disposed generally near a distal end of the leads 110 are one or more exposed conductive electrodes 117 for sensing cardiac activity and/or providing a stimulating voltage to the heart 112. The leads 110 may be implanted with their distal end situated adjacent the atrium or the ventricle, or both, of the heart 112.

In accordance with the illustrated embodiment, the implantable medical device 105 comprises a capacitor bank 120, which includes one or more capacitors (not shown) disposed therein that store energy provided by a battery (not shown) within the implantable device 105. In one embodiment of the present invention, the capacitor bank 120 stores the energy from the battery to deliver a therapeutic electric shock via the leads 110 to defibrillate the patient's heart 112. That is, when the implantable medical device 105 determines that the cardiac therapy/stimulating electric shock is needed to produce a normal sinus rhythm of the heart 112, the capacitors in the capacitor bank 120 are charged to a pre-determined charge level by the battery. When the implantable device 105 determines that a therapeutic electric shock is needed, the charge stored in the capacitors is released by discharging the capacitors of the capacitor bank 120 through the patient's heart tissue via the leads 110.

Figure 2A:
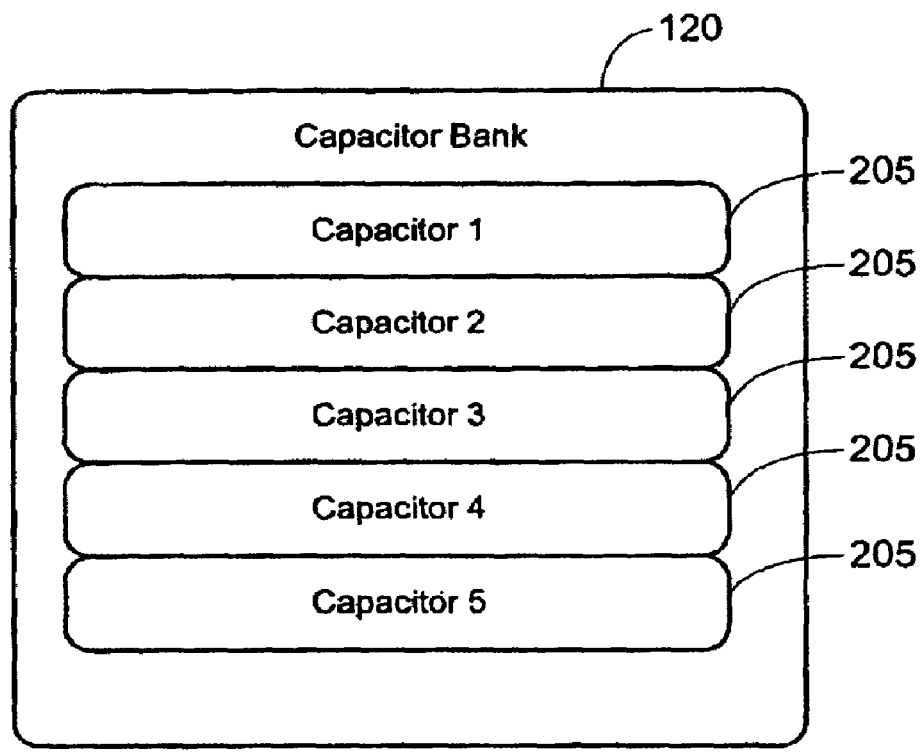
FIG. 2a schematically illustrates a capacitor bank of the implantable medical device of FIG. 1 in accordance with one embodiment of the present invention.
Figure 2B:
FIG. 2b shows the capacitor bank of FIG. 2a coupled to a battery.

Turning now to FIG. 2a, a side view perspective of the capacitor bank 120 is shown in accordance with one illustrative embodiment of the present invention. According to this embodiment, the capacitor bank 120 comprises five capacitors 205 that are connected in series. It will be appreciated that the capacitor bank 120 may include fewer or more than the five capacitors 205 illustrated in FIG. 2a without departing from the spirit and scope of the present invention. The number and size of the capacitors 205 that collectively form the capacitor bank 120 will typically depend on the magnitude of the electric shock that is desired to restore a normal heart rhythm to the patient's heart 112. The capacitors 205 within the capacitor bank 120 are typically charged to a pre-selected voltage level that corresponds to a voltage sufficient for delivery of an effective cardiac therapy to the patient 107. In accordance with the illustrated embodiment, the capacitors 205 are charged by a battery 210 that resides within the implantable medical device 105 as shown in FIG. 2b. After the capacitor bank 120 discharges and delivers an electric shock to the patient 107, the battery 210 recharges the capacitor bank 120 so it may discharge and deliver another electric shock to the patient's heart 112 when desired.

Figure 3:
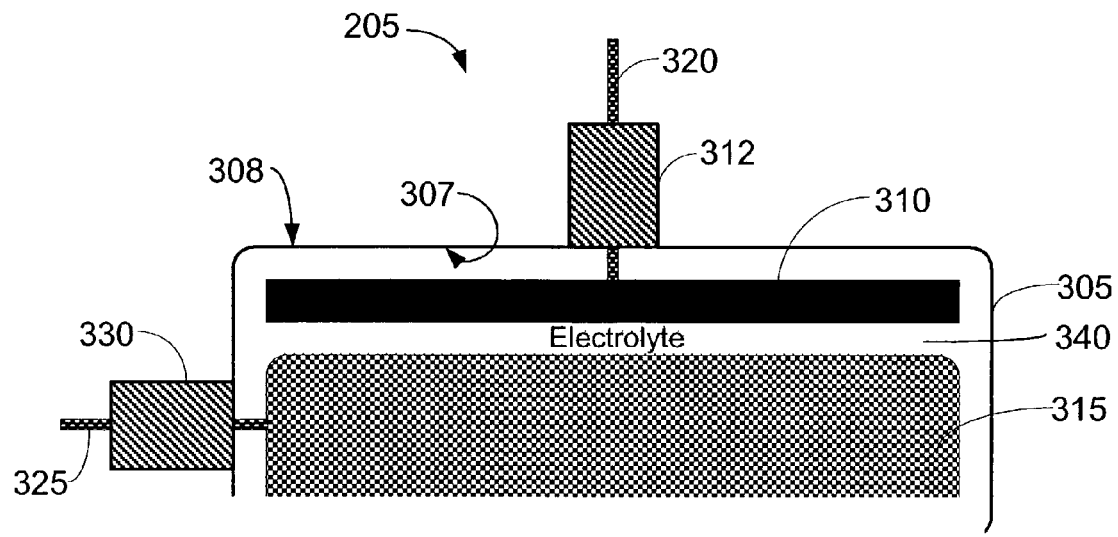
FIG. 3 provides a cross-sectional view of a capacitor that is disposed within the capacitor bank of FIG. 2a according to one embodiment.

Turning now to FIG. 3, a more detailed, cross-sectional view of one of the capacitors 205 that is disposed within the capacitor bank 120 is shown in accordance with one embodiment of the present invention. For purposes of clarity and ease in illustrating the present invention, only a portion of the capacitor 205 is shown in FIG. 3. In this particular embodiment, the capacitor 205 includes a hermetically sealed container 305 for encasing the internal contents of the capacitor 205. In accordance with one embodiment, the container 305 is constructed from titanium; however, it will be appreciated that the container 305 may be constructed from various other materials including, but not necessarily limited to, tantalum or niobium without departing from the spirit and scope of the present invention. The capacitor 205 further comprises a cathode 310, which takes the form of a metal conductive body that is disposed within the container 305. In accordance with one embodiment, the cathode 310 is separated (i.e., electrically isolated) from an inner surface 307 of the container 305.

The cathode 310 is coupled via an electrical connection to a cathode lead 320 that extends through the inner surface 307 and an outer surface 308 of the container 305. The cathode lead 320 is electrically isolated from the container 305 by a feed-through 312. In one embodiment, the feed-through 312 may be constructed of a glass insulator that seals the cathode lead 320 to the container 305 while maintaining electrical isolation between the cathode lead 320 and the container 305. The feed-through 312, in addition to electrically isolating the cathode lead 320 from the container 305, substantially prevents material, such as a fluid electrolyte, for example, from leaking out of the container 305. The feed-through 312 also substantially prevents foreign substances from entering into the container 305, thus reducing the likelihood of contamination of the container 305's internal components.

The capacitor 205 is further configured with an anode 315 that is disposed within the container 305. In one embodiment, the anode 315 may be constructed of tantalum. It will be appreciated, however, that the anode 315 may alternatively be constructed of other valve metals, such as aluminum, niobium, zirconium, and titanium. It will also be appreciated that these aforementioned examples of materials used for the anode 315 is not exhaustive. Accordingly, various other materials may be used for the anode 315 in addition to the examples provided above without departing from the spirit and scope of the present invention.

The anode 315 is electrically coupled to an anode lead 325 that passes through the inner and outer surfaces 307, 308 of the container 305 via a feed-through 330. The feed-through 330, which may be similar in construction to the feed-through 312 (as previously discussed), electrically isolates the anode lead 325 from the container 305 in substantially the same manner that the feed-through 312 electrically isolates the cathode lead 320 from the container 305.

The container 305 is filled with a fluid electrolyte 340, which is disposed between and in contact with the anode 315 and the cathode 310 of the capacitor 205. The electrolyte 340 provides a current path between the anode 315 and the cathode 310. In accordance with one embodiment, the electrolyte 340 may include a sulfuric acid solution, ammonium salts, such as ammonium acetate, dissolved in a water+glycol ether mixture, phosphoric acid, etc. The selection of the particular electrolyte 340 may depend on the reactivity of the electrolyte 340 with the materials used for the anode 315 and the cathode 310. For example, a sulfuric acid solution used as the electrolyte may be desirable when the anode 315 is composed of tantalum. If the anode 315 is constructed of aluminum, however, it may be more desirable to utilize an ammonium salt dissolved in a glycol solvent due to the adverse reactivity that aluminum tends to have with sulfuric acid.

Figure 4:
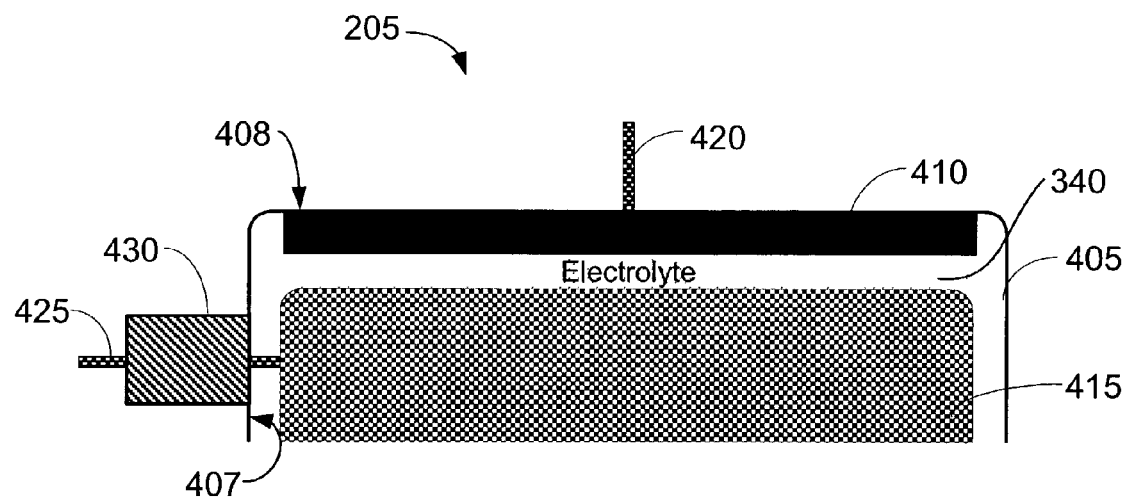
FIG. 4 shows a cross-sectional view of one of the capacitors shown in FIG. 2a in accordance with another embodiment of the present invention.

Referring now to FIG. 4, a cross-sectional view of the capacitor 205, which is located within the capacitor bank 120, is shown in accordance with another embodiment of the present invention. For purposes of clarity and ease in illustrating the present invention, again only a portion of the capacitor 205 is shown. In this particular embodiment, the capacitor 205 includes a hermetically sealed container 405 for encasing the internal contents of the capacitor 205. In accordance with the illustrated embodiment, an inside surface 407 of the container 405 includes the substrate of a cathode 410. Therefore, in this particular embodiment, the cathode 410 forms an integral part of the container 405 that encases the capacitor's internal components. The cathode 410 is coupled via an electrical connection to a cathode lead 420 that extends from an outer surface 408 of the container 405. The capacitor 205 further includes an anode 415, which is receivable within the container 405 and is electrically coupled to an anode lead 425 through a feed-through 430. In one embodiment, the feed-through 430 may be constructed of a glass insulator that seals the anode lead 425 to the container 405 while maintaining electrical isolation between the anode lead 425 and the container 405.

In one embodiment of the present invention, the anode 415 may be constructed of tantalum. Alternatively, the anode 415 may be constructed of other valve metals, such as aluminum, niobium, zirconium, and titanium. It will be appreciated, however, that the aforementioned examples of materials used for the anode 415 is not exhaustive. Accordingly, it will be appreciated that various other materials may be used for the anode 415 in addition to the examples provided above without departing from the spirit and scope of the present invention.

The container 405 is filled with the fluid electrolyte 340, which is disposed between and in contact with the anode 415 and the cathode 410 of the capacitor 205. The electrolyte 340 provides a current path between the anode 415 and the cathode 410. In accordance with one embodiment, the electrolyte 340 may include a sulfuric acid solution, ammonium salts, such as ammonium acetate, dissolved in a water+glycol ether mixture, phosphoric acid, etc.

Figure 5:
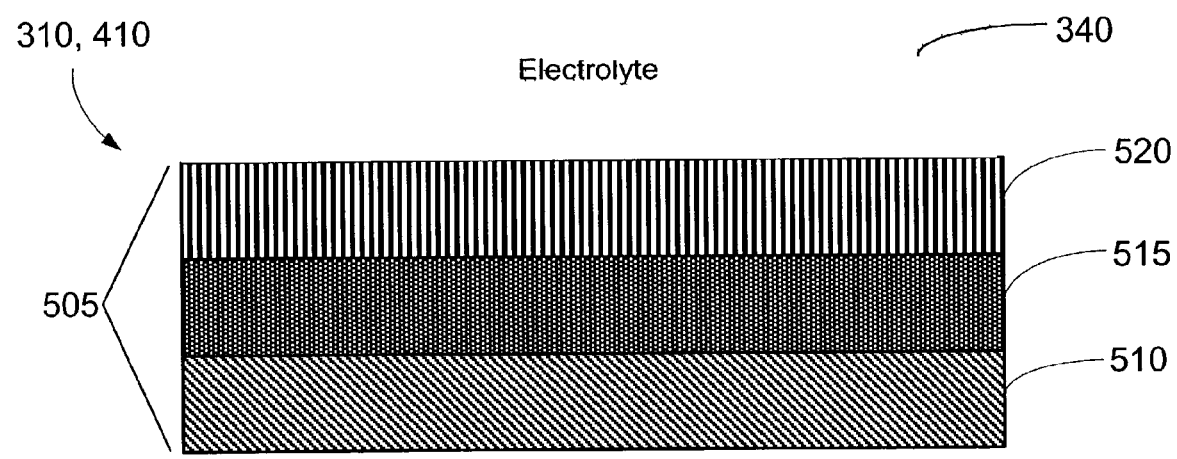
FIG. 5 illustrates a detailed cross-sectional view of layered coatings on a cathode of the capacitors of FIGS. 3 and 4.

Turning now to FIG. 5, a more detailed representation of a portion of the cathode 310, 410 (from the embodiment of FIGS. 3 and 4) is shown in accordance with one embodiment of the present invention. The cathode 310, 410 includes a conductive coating 505 that is applied thereto to enhance the electrical conductivity of the cathode 310, 410. In accordance with one embodiment, the conductive coating 505 of the cathode 310, 410 comprises a multi-layered structure that includes a substrate 510, at least one intermediate chemisorbed layer 515, and an outer layer 520. According to the illustrated embodiment, the substrate 510 takes the form of a metal conductive body, and the intermediate chemisorbed layer 515 is interposed between the substrate 510 and the outer layer 520. Suitable metals that may form the substrate 510 include tantalum, niobium, titanium, silver, and aluminum. It will be appreciated, however, that the substrate 510 need not necessarily be limited to the aforementioned metals.

In accordance with one embodiment, the outer layer 520 of the conductive coating 505 comprises a high capacitance layer that includes a carbon carrier and a metal oxide. Suitable metal oxides dispersed in the carbon carrier may include silver vanadium oxide, vanadium oxide, ruthenium oxide, manganese oxide, or nickel oxide. It will be appreciated, however, that various other electrically conductive metal oxides may be used in lieu of the aforementioned examples without departing from the spirit and scope of the present invention. In particular, the various other metal oxides may include those that are known to a skilled artisan for providing pseudo-capacitance when used as an electrode in an electrolytic capacitor with a liquid electrolyte in a potential range at the cathode of ~+0.1 V to about +1.5V.

The benefits of employing the multilayered conductive coating 505 on the cathode 310, 410 in accordance with the present invention will be realized as follows. Typically, if titanium, for example, were used to form the substrate 510 of the cathode 310, 410, the metal usually will rapidly develop a native oxide (in ambient conditions), which is generally considered to be a poor electrical conductor. However, coating the substrate 510 with carbon, and heating the coated substrate 510 in an inert atmosphere to about 600 C or, alternatively, heating the substrate 510 to about 600 to 900 C in a hydrocarbon atmosphere, will cause the oxygen within the native oxide layer to be displaced with carbon to form a thin, highly conductive, chemisorbed titanium carbide layer 515. The high-capacitance layer 520 including a carbon-metal-oxide powder mix in an appropriate carrier liquid, e.g., iso-propyl alcohol, is then spray-coated onto the metal-carbide layer 515. The entire conductive coating structure 505 is then activated by heating the structure 505 in air or oxygen to about 300 C. Using this process, the conductive coating structure 505 is developed in which the high capacitance layer 520 and the underlying metal substrate 510 are closely linked, both, mechanically and electrically by the chemisorbed, conductive layer 515. This layered conductive coating structure 505 will result in an electrical resistance across the layered structure 505, which is considerably lower than that of a spray-painted or screen-printed metal-oxide coating. It will be appreciated, however, that various other combinations of metals, carbon and metal-oxides may be used to form the conductive coating structure 505 on the inner surface of the cathode 310, 410 without departing from the spirit and scope of the present invention. For example, the chemisorbed and electrically conductive layer 515 interposed between the substrate 510 and the high-capacitance outer layer 520 may include a thin coating of silver oxide. The high capacitance outer layer 520 may in this case consist of vanadium oxide, which, by way of heating the structure 505 to about 600 C in air, may be reacted with silver vanadium oxide to provide the outer high-capacitance metal oxide layer 520 which is electrically and mechanically closely linked to the substrate 510 via the chemisorbed, conductive layer 515.

As an example, a procedure to produce a metal foil suitable as the cathode 310, 410 according to the embodiment of the present invention shown in FIGS. 3 and 4 may be performed as follows.

EXAMPLE 1

The surface of Ti foil or Ti sheet metal, 99.99% purity (Alfa Aesar), is roughened using sand paper or another suitable means of surface roughening.

The Ti foil surface is briefly etched in hot 10% hydrochloric acid and cleaned thereafter in de-ionized water.

The Ti foil is coated with a conductive carbon coating, using a commercially available graphite spray, a suspension of carbon powder in a polymeric binder, or by chemical vapor deposition (CVD) in a hydrocarbon atmosphere.

The carbon coated Ti foil is heated to 600–900 C in a vacuum or inert atmosphere so as to form the electrically conductive titanium carbide layer.

After cooling, the Ti/TiC/C structure is coated with a suspension of $MnO_2$ and carbon powders in isopropyl alcohol, using a gas-pressure operated spray gun, for example.

The multi-layered structure is heated to about 350 C in air so as to activate the carbon-metal-oxide layer.

In an alternative embodiment, the procedure given in Example 1 may be performed as follows.

EXAMPLE 2

The surface of Ti foil or Ti sheet metal, 99.99% purity (Alfa Aesar), is roughened using sand paper or another suitable means of roughening.

The Ti foil surface is briefly etched in hot 10% hydrochloric acid.

The Ti foil is coated with a conductive carbon coating, using, commercially available graphite spray, a suspension of carbon powder in a polymeric binder, or by chemical vapor deposition (CVD) in a hydrocarbon atmosphere.

The Ti/TiC structure is coated with a solution of a chloride pre-curser of the metal-oxide, e.g., $RuCl_3$, in a graphite-isopropyl suspension using a pressure spray gun, for example.

The Ti/TiC/C+$RuCl_3$ structure is heated in air or oxygen to about 350 C to activate the graphite and to form the high capacitance C+$RuO_2$ layer.

As yet another example, the procedure to prepare a suitable cathode 310, 410 may be performed as follows.

EXAMPLE 3

The surface of Ag foil or Ag sheet metal, 99.99% purity (Alfa Aesar), is roughened using sand paper or another suitable means of roughening. Alternatively, Ag may be vapor deposited on a previously roughed surface.

A thin layer of the Ag substrate is electrochemically oxidized to $Ag_2O$.

The silver oxide surface is coated with a suspension of $V_2O_5$ and graphite or carbon powder in isopropyl alcohol.

The solvent is evaporated so as to leave a thin coat of $V_2O_5$ and carbon on the surface of the $Ag_2O$.

The $Ag_2O/C+V_2O_5$ system is heated in air to about 600 C so as to form the high capacitance silver vanadium oxide layer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A capacitor, comprising:
   an anode;
   a cathode having a conductive coating, the conductive coating including a chemisorbed, electrically conductive layer interposed between a metal substrate and an outer layer including a mix of activated carbon with a metal-oxide; and
   an electrolyte disposed and in contact between the anode and the cathode.

2. The capacitor of claim 1, wherein the anode includes a metal of the group including tantalum, aluminum, niobium, zirconium, and titanium.

3. The capacitor of claim 1, wherein the electrolyte comprises at least one from the group including sulfuric acid solution, ammonium salts dissolved in a water and a glycol ether mixture, and a phosphoric acid material.

4. The capacitor of claim 1, wherein the metal-oxide includes one of the group including silver vanadium oxide, carbon hexaflouride, vanadium oxide, ruthenium oxide, iridium oxide, manganese oxide, and nickel oxide.

5. The capacitor of claim 1, wherein the capacitor further comprises a container, and wherein the anode and electrolyte are disposed within the container and the container forms a part of the cathode.

6. The capacitor of claim 5, wherein the cathode further comprises a metal body that is electrically coupled to an inner surface of the container and the metal body forms a part of the cathode.

7. The capacitor of claim 5, wherein the conductive coating is applied to an inner surface of the metal body.

8. The capacitor of claim 4, wherein the conductive coating is applied to an inner surface of the container.

9. The capacitor of claim 1, wherein the capacitor is a component of an implantable medical device.

10. A capacitor, comprising:
    a container having an inner surface;
    an anode that is disposed within the container;
    a cathode including a conductive coating that is applied to the inner surface of the container, wherein the conductive coating includes a chemisorbed, electrically conductive layer interposed between a metal substrate and a layer including a mix of activated carbon with a metal-oxide; and
    an electrolyte disposed and in contact between the anode and the cathode.

11. The capacitor of claim 10, wherein the anode includes a metal of the group comprising tantalum, aluminum, niobium, zirconium, and titanium.

12. The capacitor of claim 10, wherein the electrolyte comprises at least one from the group comprising sulfuric acid solution, ammonium salts dissolved in a water+glycol ether mixture, and phosphoric acid.

13. The capacitor of claim 10, wherein the metal-oxide includes one of the group including silver vanadium oxide, carbon hexafluoride, vanadium oxide, ruthenium oxide, iridium oxide, manganese oxide, and nickel oxide.

14. The capacitor of claim 10, wherein the inner surface of the container is electrically coupled to a metal body that encircles the anode, and wherein the conductive coating is applied to the inner surface of the metal body.

15. The capacitor of claim 10, wherein the capacitor is a component of an implantable medical device.

16. An implantable medical device, comprising:
   a battery for supplying energy; and
   a capacitor, electrically coupled to the battery, for storing the energy supplied from the battery; and
   wherein the capacitor includes an electrolyte, anode, and a cathode, the cathode having a conductive coating including a chemisorbed, electrically conductive layer interposed between a metal substrate and a layer including a mix of activated carbon with a metal-oxide.

17. The implantable medical device of claim 16, wherein the anode includes a metal of the group including tantalum, aluminum, niobium, zirconium, and titanium.

18. The implantable medical device of claim 16, wherein the electrolyte comprises at least one from the group including sulfuric acid solution, ammonium salts dissolved in a water and a glycol ether mixture, and phosphoric acid.

19. The implantable medical device of claim 16, wherein the metal-oxide includes one of the group including silver vanadium oxide, carbon hexafluoride, vanadium oxide, ruthenium oxide, iridium oxide, manganese oxide, and nickel oxide.

20. The implantable medical device of claim 16, wherein the capacitor further comprises a container, and wherein the anode and electrolyte are disposed within the container and the container forms a part of the cathode.

21. The implantable medical device of claim 20, wherein the cathode further comprises a metal body that is electrically coupled to an inner surface of the container and the metal body forms a part of the cathode.

22. The implantable medical device of claim 21, wherein the conductive coating is applied to the inner surface of the metal body.

23. The implantable medical device of claim 20, wherein the conductive coating is applied to the inner surface of the container.

24. A method, comprising:
   providing an anode; and
   providing a cathode including a conductive coating that includes a chemisorbed, electrically conductive layer interposed between a metal substrate and a layer including a mix of activated carbon with a metal-oxide; and
   providing an electrolyte disposed between the anode and cathode.

25. The method of claim 24, wherein providing an anode further comprises:
   providing an anode that includes a metal of the group including tantalum, aluminum, niobium, zirconium, and titanium.

26. The method of claim 24, wherein providing an electrolyte further comprises:
   providing an electrolyte, which includes at least one from the group including sulfuric acid solution, ammonium salts dissolved in a water+glycol ether mixture, and phosphoric acid.

27. The method of claim 24, wherein providing a cathode, further comprises:
   providing a cathode including a conductive coating that includes a chemisorbed, electrically conductive layer interposed between a metal substrate and a layer including a mix of activated carbon with a metal-oxide, the metal-oxide comprising one of the group including silver vanadium oxide, carbon hexafuoride, vanadium oxide, ruthenium oxide, iridum oxide, manganese oxide, and nickel oxide.

* * * * *